United States Patent Office 3,078,243
Patented Feb. 19, 1963

3,078,243
AQUEOUS SPINNING DISPERSION OF ACRYLO-
NITRILE POLYMER CONTAINING NITRILE
SOLVENT
Aubert Holmes Bibolet, Feasterville, Pa., George L.
Brown, Moorestown, N.J., and George A. Richter, Jr.,
Abington, and Robert P. Fellmann, Levittown, Pa., as-
signors to Rohm & Haas Company, Philadelphia, Pa.,
a corporation of Delaware
No Drawing. Filed Dec. 27, 1957, Ser. No. 705,487
16 Claims. (Cl. 260—29.6)

This invention is concerned with aqueous spinning compositions comprising water-insoluble emulsion polymers of a mixture of acrylonitrile or methacrylonitrile and at least one other copolymerizable monoethylenically unsaturated monomer (or monovinylidene compound) in which the proportion of acrylonitrile is at least 50% by weight of the total weight of monomers and is preferably at least 60% by weight thereof. It is particularly concerned with such compositions which also contain an agent herein after termed "fusion-aids" which improves the spinning and handling of the compositions.

This application is a continuation-in-part of our co-pending application U.S. Serial No. 532,789, filed September 6, 1955 now U.S. Patent 2,914,376.

Compounds effective as fusion-aids have solubility in the polymer with which it is to be used and have a favorable distribution coefficient toward polymer in a polymer-water system. A fusion-aid is a solvent for the copolymer which remains substantially completely dissolved within the copolymer particles in the aqueous dispersion. It should not be highly volatile but preferably is removable by vaporization or distillation during the fuse-drying stage of fiber production as described in the above-identified application for patent.

Since a fusion-aid must be a solvent for a given copolymer, it is first of all examined for its solubilizing action. A portion of 0.5 gram of copolymer is taken up in 25 ml. of the proposed fusion-aid. If the copolymer fails to dissolve, the liquid under examination is obviously not a fusion-aid. If the copolymer dissolves, it must not be precipitated from solution upon addition of water to the solution. Thus, 5 ml. of water is added to the above solution, the resulting mixture is stirred for about five minutes, and the stirred mixture is left standing for fifteen minutes. If layers form without precipitation of polymer, the liquid under examination can be used as a fusion-aid. It is preferred that fusion-aids boil below about 400° C.

To illustrate the selection of organic liquids as fusion-aids there is cited a case wherein there was prepared a dispersion of a copolymer of 75 parts by weight of acrylonitrile and 25 parts of 3,3,5-trimethylcyclohexyl acrylate. Solid polymer was separated by freeze-drying. It was washed with water to remove soap and other water-soluble components. Residual monomers were removed with benzene-denatured ethanol. The copolymer was then dried to constant weight under reduced pressure at about 30° C. One-half gram portions were added to 25 ml. of a variety of organic liquids. The copolymer was soluble in dimethylformamide, adiponitrile, β,β'-dicyanoethylamine, dimethylsulfolane, α-methylsuccinonitrile, and nitromethane. It was insoluble, for example, in 90% formic acid, which was thereby ruled out as a possible fusion-aid.

To each of the solutions of copolymer was added a 5.0 ml. portion of distilled water. The resulting mixture was stirred for five minutes and allowed to stand for fifteen minutes. Polymer was precipitated immediately after addition of water to the dimethylformamide solution. It would not be expected then to be a fusion-aid.

Actual trials of spinning by procedures described below showed that this compound was not of value when present in the copolymer. Solid copolymer precipitated from the solution in β,β'-dicyanoethylamine. It, too, was shown not to be a fusion-aid for this particular copolymer. This was also true for dimethylsulfolane, from which polymer was precipitated. On the other hand, adiponitrile, α-methylsuccinonitrile, and nitromethane were found of value as spinning aids, and as solvents. Their solutions did not precipitate polymer upon addition of water.

Also found effective as fusion-aids for polymers formed in major proportion from acrylonitrile or methacrylonitrile were phenylacetonitrile, butyronitrile, hexanenitrile, N-methylsuccinonitrile, acrylonitrile or methacrylonitrile monomers, endomethylenetetrahydrobenzonitrile, succinonitrile, benzonitrile, isobutyronitrile, and furonitrile.

As a practical matter it is preferable that the organic liquids selected as fusion-aids have boiling points above the temperature of the coagulating bath. Also, they should be volatile under the temperature conditions within which the filaments or films are processed, although they need not boil below these processing temperatures.

There may be incorporated as a fusion-aid from 1% to 40% by weight of one or more organic liquids meeting the above requirements, the percentage being based on the weight of the copolymer. Usually the weight of fusion-aid, if used, will be from 10% to 20% of the weight of copolymer. In some cases the fusion-aid can be added to one or more of the comonomers at the time it is introduced into the polymerization vessel provided that the presence of the chosen organic liquid does not interfere with polymerization. In some cases a fusion-aid can be directly added to the dispersion of copolymer. This step can be taken if addition of organic liquid does not cause coagulation of the dispersion of copolymer. A way around this undesired phenomenon is to emulsify the organic liquid and add the resulting emulsion to the dispersion of copolymer.

The dispersions of thermoplastic resins here used are obtained by emulsifying a mixture of monomers containing at least 50% (and preferably at least 60%) of at least one monomer of the formula

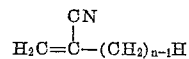

where $n$ is an integer having a value of 1 to 2 and at least one other copolymerizable monoethylenically unsaturated comonomer, and polymerizing the thus formed emulsion under the influence of a free-radical catalyst, usually in a redox system. The polymeric product when isolated and dried must have an apparent second order transition temperature, $T_g$ between 25° C. and 180° C. Mixtures of dispersions of different polymers and/or copolymers may also be used.

The apparent second order transition temperature ($T_g$) is defined as that temperature at which the first derivative of thermodynamic variables, such as coefficient of expansion or heat capacity, changes abruptly. This transition temperature is an inflection temperature which is conveniently found by plotting the modulus of rigidity against temperature. A convenient method for determining such modulus and transition temperature is described by Williamson, British Plastics 23, 87–90. The $T_g$ values here used are generally those temperatures at which the modulus is 300 kg./cm.²

The comonomer or comonomers used with the nitrile monomer may be of a wide variety, such as ethyl, propyl, butyl, or octyl acrylate, or butyl, amyl, hexyl, or octyl methacrylate or ethoxyethyl or butoxyethyl acrylate, or methacrylate.

A series of spinnable dispersions can be made, for example, from acrylonitrile and ethyl acrylate. Typical copolymers from these two materials may be made in ratios of 75:25 ($T_g$, 95° C.), 70:30 ($T_g$, 87° C.), 60:40 ($T_g$, 70° C.), and, of course, at any other ratio giving higher $T_g$ values to about 180° C.

Copolymers from more than two monomers may also be used. Thus, for extension of data obtained with copolymers based primarily on acrylonitrile and ethyl acrylate, 5-hydroxypentyl vinyl ether in an amount of 5% by weight was introduced as a third component. With a ratio of acrylonitrile to ethyl acrylate to this ether of 60:35:5 a $T_g$ value of about 45° C. was noted.

In the emulsion polymerization of monomers to give dispersions of polymeric products having the specified $T_g$ values there may be used any of the conventional emulsifiers, anionic, cationic, or non-ionic, such as sodium dodecyl sulfate or sulfonate, sodium pentadecylbenzenesulfonate, sodium octylphenoxyethoxyethylsulfonate, octylphenoxypolyethoxyethanol, tetradecylthiopolyethoxyethanol, ethylene oxide condensates of tall oil and other long-chained fatty acids, lauryldimethylbenzylammonium chloride, dodecylbenzyltrimethylammonium chloride, or any of the many wetting agents and emulsifiers which are generally advocated for forming aqueous emulsions. Some emulsifiers are better for handling a given monomer or a mixture of monomers than others. But a few simple trials are needed to establish a good emulsifying system. In some cases, a mixture of agents is desirable. Amounts of emulsifying agent may vary from a few tenths percent to ten or more percent of the weight of monomer or monomers.

As polymerization initiator there may be used one or more of the peroxides or azo initiators, which act as free-radical catalysts and which are known to be effective between about 30° and 100° C., such as benzoyl peroxide, tert-butyl hydroperoxide, cumene hydroperoxide, tetralin peroxide, acetyl peroxide, caproyl peroxide, tert-butyl perbenzoate, or methyl ethyl ketone peroxide, or azodiisobutyronitrile, dimethyl azodiisobutyrate, etc. In aqueous systems ammonium, sodium, or potassium persulfate is generally most convenient, particularly when used in conjunction with a reducing agent, such as a sulfite, bisulfite, metabisulfite, or hydrosulfite, as of an alkali metal, to provide a redox system, which will start the polymerization reaction at a low or moderate temperature. Often the addition of a few parts per million of polyvalent metal, such as iron, accelerates the reaction. Monomer or mixtures of monomers and/or catalyst may be added in small increments as the polymerization reaction proceeds. In this way, a dispersion is formed with a relatively high solids content. These dispersions do not have, however, a marked viscosity. This is characteristic of systems containing the copolymer as dispersed particles in contrast with systems containing dissolved copolymer particles.

Aqueous dispersions containing at least 20% by weight of the nitrile polymer and a fusion-aid obtained in the general manner so far described can be spun through a spinneret or film-forming slit into alkaline aqueous coagulating baths containing from 5 to 50% by weight of an electrolyte. However, if desired, aqueous dispersions containing the fusion-aid and 20% by weight of the nitrile polymer can be made having a pH of at least about 7 which can be spun into acid aqueous coagulating baths by using acid-sensitive emulsifiers for the polymerization. The preparation of such dispersions containing 20 to 65% by weight, and preferably 25 to 50% by weight, of the nitrile polymer and the formation of fibers, films, etc., therefrom are described in our patent mentioned above, and such description is incorporated herein by reference.

Whether the alkaline or acid coagulating bath is used, the coagulating bath is maintained at a temperature above the $T_g$ value of the solvated copolymer in the bath. The temperature of the aqueous dispersion fed to the orifice is usually between 20° and 50° C. The bath temperature is usually from 50° to 105° C. Copolymers with higher $T_g$ values should be passed through coagulating baths at relatively higher temperatures than those with lower $T_g$ values, although the $T_g$ of the solvated, coagulated copolymer at this point, when a fusion-aid is present, will be considerably below the $T_g$ of the dry copolymer itself. The fusion-aid enables use of a lower bath temperature or better results from a bath at a given temperature.

Whether the acid or alkaline coagulating procedure is used, the coagulated and partially coalesced structure is drawn at constant speed from the coagulating bath, optionally washed or neutralized, and passed through a drying zone where water is driven off. This is usually accomplished by passing the shaped object through a zone at a temperature between 60° and 400° C., preferably at 100° to 250° C.

Either during the drying operation or thereafter the shaped object is carried to a sufficiently high temperature to carry the shaped object above the $T_g$ value of the copolymer. As the copolymer is heated to temperatures at which water is driven off, together with other volatile materials, such as fusion-aids, the observable $T_g$ value increases to about the $T_g$ value for the dry copolymer in question. It is believed that the fusion-aid is, in effect, steam-distilled off with the water. The temperature of the shaped object is carried above this value but it is not carried to a point at which degradations or thermal mutations, (i.e., evident changes in degree of polymer size or decomposition caused by heat) would occur. Usually a temperature is reached within the shaped object which is at least 30° C. above the $T_g$ of the dry copolymer.

Under these conditions there is effected sufficient coalescence of particles to give good cohesion, and some strength. Some retraction in yarn, filament, or film may occur unless tension is applied thereto.

Drying and joining of particles in the way described may be accomplished in one operation or in several steps. Generally, it is most convenient to bring about these effects in a single zone in which the temperature is high enough to promote coalescence as well as drying and the time is sufficient to allow these actions to proceed satisfactorily. The over-all operation here is best described by the term "fuse-drying."

Thereafter the fiber, film, or the like may be stretched and given other after-treatments, such as cross-linking.

In the examples following, which are illustrative of the present invention, the parts and percentages are by weight unless otherwise indicated.

*Example 1*

To 200 parts of distilled water at room temperature is added 6 parts of an aqueous solution containing 2% of ferrous sulfate heptahydrate and 4% of the sodium salt of ethylenediamino-tetraacetic acid adjusted to pH 4 with 0.5 N sulfuric acid solution. Then 2¼ parts of coconut soap (potassium coconate) is added followed by 0.6 part of sodium formaldehyde sulfoxylate $2H_2O$. The pH of the solution is adjusted to 10.5 with 0.5 N NaOH. A mixture of 70 parts of acrylonitrile and 30 parts of 3,3,5-trimethylcyclohexyl acrylate is added with stirring, and the air above the resulting emulsion is replaced by nitrogen. Then 20 parts of adiponitrile is added. To the emulsion is now added 0.15 part of phenylcyclohexane hydroperoxide as a 10% solution in toluene. After a short induction period, polymerization starts as evidenced by a sharp temperature rise. The temperature is now controlled by cooling to remain in the range 35° to 40° C. Over 85% conversion to a dispersion of fine particle size (less than 0.1 micron in diameter) is achieved in about one-half hour after addition of the phenylcyclohexane hydroperoxide. The copolymer contained in this dispersion has a $T_g$ of about 120° C. as determined without adiponitrile present.

The dispersion prepared as described above is metered at the rate of 2.8 grams per minute through a spinneret into a coagulating bath. The spinneret consists of a platinum alloy. It has a face diameter of 0.5 inch and contains 40 holes each of 0.0025 inch diameter. The coagulating bath is an aqueous solution containing 4.0% hydrogen chloride and 0.6% ferric chloride which is maintained at 86° C. The bundle of filaments formed is drawn through the bath at the rate of about ten meters per minute. The immersion in the bath is three inches. The strength of the yarn as it is drawn from the bath is substantially higher than would be the case if no adiponitrile were used. The yarn is washed slightly with water at room temperature and dried in contact with a metal surface at 260° C. It is then passed over rolls revolving at differential speeds to stretch the yarn about 600%. During this operation, the yarn is heated to about 170° C.

The resulting yarn is lustrous and white and has the following properties:

Denier, 121;
Tenacity (65% RH, 72° F.), 2.8 grams per denier; and
Extensibility (65% RH, 72° F.), 18%.

When heated to 150° C. the yarn shrinks about 30%. The strength of the yarn as it is drawn from the bath is substantially higher than would be the case if no adiponitrile were used.

*Example 2*

The procedure is he same as in Example 1 except the yarn is heated while held at constant length for 15 minutes at 190° C.

The resulting yarn has the following properties:

Denier, 112;
Tenacity (65% RH, 72° F.), 3.6 grams per denier; and
Extensibility (65% RH, 72° F.), 32%.

When heated to 150° C., the yarn shrinks only about 5%.

*Example 3*

The procedure is the same as in Example 2 except that the coagulating bath is aqueous 8% phosphoric acid, the amount of stretch is about 700%, and the stretched yarn is heated 3 minutes at 225° C. The resulting yarn has the following properties:

Denier, 102;
Tenacity (65% RH, 72° F.), 2.9 grams per denier; and
Extensibility (65% RH, 72° F.), 24%.

When heated to 150° C., the yarn shrinks 10%.

*Example 4*

The procedure is the same as in Example 2 except that the coagulating bath is aqueous 4% oxalic acid. The resulting yarn has the following properties:

Denier, 110;
Tenacity (65% RH, 72° F.), 3.1 grams per denier; and
Extensibility (65% RH, 72° F.), 28%.

When heated to 150° C., the yarn shrinks 7%.

*Example 5*

The procedure is the same as in Example 2 except that the adiponitrile is added as a 30% emulsion in water after the polymerization is complete. Yarn properties are substantially the same as in Example 2.

*Example 6*

The procedure is the same as in Example 4 except α-methylsuccinonitrile is added with the monomers instead of adiponitrile. Yarn properties are substantially the same as in Example 2.

*Example 7*

The procedure is the same as in Example 2 except an equal weight of nitromethane is added with the monomers instead of adiponitrile. Yarn properties are substantially the same as in Example 2.

*Example 8*

The procedure is the same as in Example 2 except phenylacetonitrile is added with the monomers instead of adiponitrile. Yarn properties are substantially the same as in Example 2.

*Example 9*

The procedure is the same as in Example 5 except that 20% of methacrylonitrile (based on monomer charge) is added as a 30% emulsion in water after the polymerization is essentially completed. Yarn properties are substantially the same as in Example 2.

*Example 10*

The procedure is like that of Example 2 except that 10 parts of succinonitrile (based on monomer charge) is added with the monomers instead of the adiponitrile. Yarn properties are substantially the same as in Example 2.

*Example 11*

A dispersion is prepared as described in Example 1 except that 5 parts of the sodium salt of 9,10-epoxystearic acid is used instead of 2¼ parts of coconut soap and a mixture of 65 parts of acrylonitrile and 35 parts of p-tert-octylphenoxyethyl vinyl ether is used in place of the 70 parts of acrylonitrile and 30 parts of 3,3,5-trimethylcyclohexyl acrylate. The copolymer contained in this dispersion has a $T_g$ of about 120° C. The resulting latex is spun, dried, and stretched as described in Example 1 except that the degree of stretch is about 900%. The stretched yarn is heated while being maintained in its stretched condition for 15 minutes at 190° C. The resulting yarn has the following properties:

Denier, 84;
Tenacity (65% RH, 72° F.), 2.5 grams per denier; and
Extensibility (65% RH, 72° F.), 28%.

When heated to 150° C., the yarn shrinks only about 3%.

*Example 12*

A dispersion is prepared as described in Example 1 except that a mixture of 60 parts of acrylonitrile and 40 parts of p-tert-octylphenoxyethyl acrylate is used in place of the 70 parts of acrylonitrile and 30 parts of 3,3,5-trimethylcyclohexyl acrylate. The copolymer contained in this dispersion has a $T_g$ of about 100° C. The resulting dispersion is spun, dried, and stretched as described in Example 1 except that aqueous 4% phosphoric acid is used instead of the 4% hydrogen chloride and 0.6% ferric chloride coagulating bath. The stretched yarn is heated while being maintained in its stretched condition for 17 minutes at 175° C. The resulting yarn has the following properties:

Denier, 144;
Tenacity (65% RH, 72° F.), 2.2 grams per denier; and
Extensibility (65% RH, 72° F.) 22%.

When heated to 150° C., the yarn shrinks only about 2.5%.

*Example 13*

A dispersion is prepared as described in Example 1 except that 4.5 parts instead of 2.25 parts of coconut soap is used as the emulsifier and a mixture of 80 parts of acrylonitrile and 20 parts of 2-acryloxynorcamphane (the acrylic acid norcampanyl ester) is used in place of the 70 parts acrylonitrile and 30 parts of 3,3,5-trimethylcyclohexyl acrylate. The copolymer contained in this dispersion has a $T_g$ of about 105° C. The resulting dispersion is spun, dried, and stretched as described in Example 1. This uncured yarn has the following properties:

Tenacity (65% RH, 72° F.), 3.0 grams per denier; and
Extensibility (65% RH, 72° F.), 15%.

*Example 14*

A latex is prepared as described in Example 1 except that 3 parts of the sodium salt of 9,10-epoxystearic acid is used instead of 2.25 parts of coconut soap as the emulsifier and a mixture of 70 parts of acrylonitrile, 20 parts of 2-n-butoxyethyl acrylate, and 10 parts of N-isopropenyl-4,4-dimethyloxazoline is used as the monomer charge.

The resulting latex is forced by air pressure through a glass capillary approximately 2 inches long and 0.009 inch inside diameter the tip of which is held below the surface of an aqueous 5% citric acid bath at 90° C. The rate of flow of the emulsion through the capillary is about 0.2 gram per minute. The filament formed is drawn from the capillary at the rate of about 10 meters per minute, dried without washing at 250° C., and stretched about 600% at 150° C. The stretched filament is heated while being maintained at constant length for one hour at 130° C. The resulting filament has the following properties:

Denier, 15;
Tenacity (65% RH, 72° F.), 2.9 grams per denier; and
Extensibility (65% RH, 72° F.), 15%.

On heating to 150° C., the filament shrinks about 24%.

*Example 15*

The same procedure is used as in Example 14 except that a mixture of 70 parts of acrylonitrile and 30 parts of 5-acryloxy-3a,4,7,7a-tetrahydro-4,7-methanoindene is used as the monomer charge and the stretched filament is heated at constant length for 15 minutes at 190° C.

Filament properties are as follows:

Denier, 17;
Tenacity (65% RH, 72° F.), 2.0 grams per denier; and
Extensibility (65% RH, 72° F.), 35%.

When heated to 150° C., the filament shrinks about 12%.

*Example 16*

The same procedure is used as in Example 14 except that a mixture of 70 parts of acrylonitrile and 30 parts of isobornyl acrylate is used as the monomer charge and the stretched filament is heated at constant length for 10 minutes at 200° C. The resulting filament has the following properties:

Denier, 14;
Tenacity (65% RH, 72° F.), 2.0 grams per denier; and
Extensibility (65% RH, 72° F.), 10%.

When heated to 150° C., the filament shrinks about 20%.

*Example 17*

A dispersion is prepared as described in Example 1 except that 4.5 parts instead of 2.25 parts of coconut soap is used as the emulsifier and a mixture of 75 parts of acrylonitrile, 15 parts of 3,3,5-trimethylcyclohexyl acrylate, and 10 parts of methyl methacrylate is used instead of 70 parts acrylonitrile and 30 parts 3,3,5-trimethylcyclohexyl acrylate. The copolymer contained in this dispersion has a $T_g$ of about 110° C.

The resulting latex is spun, dried, and stretched as described in Example 1. The stretched yarn is heated while being maintained in the stretched condition for 20 minutes at 190° C. The resulting yarn has the following properties:

Denier, 112;
Tenacity (65% RH, 72° F.), 2.2 grams per denier; and
Extensibility (65% RH, 72° F.), 25%.

When heated to 150° C., the yarn shrinks only about 5.5%.

*Example 18*

A dispersion is prepared as described in Example 1 except that 4.5 parts instead of 2.25 parts of coconut soap is used as the emulsifier and a mixture of 70 parts of acrylonitrile, 20 parts of 3,3,5-trimethylcyclohexyl acrylate, and 10 parts of N-vinyl pyrrolidone is used as the monomer charge instead of 70 parts of acrylonitrile and 30 parts of 3,3,5-trimethylcyclohexyl acrylate. The copolymer contained in this dispersion has a $T_1$ of about 90° C.

The resulting dispersion is spun as described in Example 13 to give a filament which in the stretched state has the following properties:

Denier, 15;
Tenacity (65% RH, 72° F.), 2.6 grams per denier;
Extensibility (65% RH, 72° F.), 22%; and
Moisture regain (75% RH, 98° F.), 2.0%.

The moisture regain (75% RH, 98° F.) of yarn prepared as in Example 3 (70:30 acrylonitrile 3,3,5-trimethylcyclohexyl acrylate) is 1.3%.

*Example 19*

The same procedure is followed as in Example 18 except a mixture of 70 parts of acrylonitrile, 25 parts of 3,3,5-trimethylcyclohexyl acrylate, and 5 parts of 2-(dimethylamino)ethyl vinyl ether is used as the monomer charge. The resulting filament has the following properties:

Denier, 18;
Tenacity (65% RH, 72° F.), 1.9 grams per denier;
Extensibility (65% RH, 72° F.), 18%; and
Moisture regain (75% RH, 98° F.), 1.9%.

*Example 20*

The same procedure is used as in Example 18 except a mixture of 70 parts of acrylonitrile, 25 parts of 3,3,5-trimethylcyclohexyl acrylate, and 5 parts of 2-(dimethylamino)ethyl methacrylate is used as the monomer charge. The resulting filament has the following properties:

Denier, 16;
Tenacity (65% RH, 72° F.), 1.6 grams per denier;
Extensibility (65% RH, 72° F.), 21%; and
Moisture regain (75% RH, 98° F.), 1.9%.

*Example 21*

The same procedure is followed as in Example 18 except a mixture of 70 parts of acrylonitrile, 25 parts of 3,3,5-trimethylcyclohexyl acrylate, and 5 parts of methacrylamide is used as the monomer charge. The resulting filament has the following properties:

Denier, 30;
Tenacity (65% RH, 72° F.), 1.4 grams per denier;
Extensibility (65% RH, 72° F.), 12%; and
Moisture regain (75% RH, 98° F.), 2.6%.

*Example 22*

In 200 parts of distilled water at room temperature is dissolved 10 grams of polyvinyl pyrrolidone (3-GA-PVP-283, General Aniline and Film Co., Inc.). The procedure for manufacture of dispersion described in Example 1 is then followed with use of the same weights of materials there used (cf. Example 1) including the addition of 20 parts of adiponitrile, the various ingredients being added to the polyvinyl pyrrolidone solution. The copolymer contained in the dispersion has a $T_g$ of about 120° C.

The resulting dispersion is spun as described in Example 1.

The stretched yarn is heated (cured) while being maintained in a stretched condition for 15 minutes at 190° C. The resulting yarn has the following properties:

Denier, 114;
Tenacity (65% RH, 72° F.), 3.1 grams per denier;
Extensibility (65% RH, 72° F.), 25%; and
Moisture regain of uncured yarn, (75% RH, 98° F.), 2.4%.

When heated to 150° C., the yarn shrinks about 3%.

*Example 23*

A dispersion is prepared as in Example 22 except that 10 parts of polyacrylamide is dissolved in 200 parts of water prior to the addition of the polymerization ingredients. The resulting latex is spun by capillary as described in Example 13 except that aqueous 4% phosphoric acid at 85° C. is used as the coagulating bath.

The stretched filament is heated while being maintained in the stretched condition for 20 minutes at 190° C. The properties of the filament are as follows:

Denier, 20;
Tenacity (65% RH, 72° F.), 2.8 grams per denier; and
Extensibility (65% RH, 72° F.), 22%.

When heated to 150° C., the filament shrinks about 14%. The moisture regain (75% RH, 98° F.) of the uncured filament is 1.5%.

*Example 24*

A dispersion is prepared as described in Example 1 except that 3 parts of sodium diisobutylphenoxyethoxyethoxyethyl sulfate is used as the emulsifier instead of coconut soap.

The resulting latex is spun by capillary as in Example 13 to yield a filament which after drying and stretching has the following properties:

Denier, 19;
Tenacity (65% RH, 72° F.), 2.5 grams per denier; and
Extensibility (65% RH, 72° F.), 25%.

*Example 25*

To 280 parts of distilled water at room temperature is added 5 parts of potassium laurate and the pH of the solution is adjusted to 10.5 with aqueous 10% sodium hydroxide solution. To this solution is added with stirring 0.35 parts of sodium ethylenediaminotetraacetate, 0.60 part of phenylcyclohexane hydroperoxide, and a mixture of 65 parts of acrylonitrile and 35 parts of 3,3,5-trimethylcyclohexyl acrylate. The activator mixture to be added to this emulsion is prepared as follows: In 10 parts of distilled water under nitrogen is dissolved 1.11 parts of $FeSO_4 \cdot 7H_2O$. In 10 parts of distilled water under nitrogen (separate from the ferrous sulfate solution) is dissolved 1.78 parts of $Na_4P_2O_7 \cdot 10H_2O$. The two solutions are mixed. After being well flushed with nitrogen, the suspension of ferrous pyrophosphate is aged at 50° C. for 20 minutes. During this period a slow stream of nitrogen is blown over the surface of the other ingredients which are being stirred in the reaction vessel. After all material is cooled to 0° to 5° C., the iron suspension is poured into the reaction vessel containing monomer, water, emulsifier, and initiator. An ice bath is maintained around the reaction vessel. The temperature of the emulsion rises above 35° C. within a few minutes. After the temperature drops to 35° C., the ice bath is removed. Essentially quantitative yield is realized.

To this dispersion is added with stirring 20 parts of α-methyl succinonitrile emulsifier in 40 parts of water.

The latex is then spun into a yarn as described in Example 1. Properties of the stretched yarn are as follows:

Denier, 90;
Tenacity (65% RH, 72° F.), 2.6 grams per denier; and
Extensibility (65% RH, 72° F.), 20%.

*Example 26*

A copolymer was prepared in aqueous dispersion with an anionic emulsifier to contain 75% of acrylonitrile and 25% of ethyl acrylate by weight. The copolymer constituted 25% of the dispersion. Then adiponitrile was emulsified in water in the weight ratio of 1:3 (adiponitrile:water) and 20 parts by weight of the emulsion is mixed with 100 parts by weight of the copolymer dispersion. The resulting mixture was forced under constant pressure through a glass capillary of 0.009 inch diameter into an aqueous 30% sodium hydroxide solution at 90° C. The resulting single filament was passed through an aqueous 50% acetic acid solution, washed with water, passed through an oven at 200° C., heat-stretched about 500% at about 250° C. and cooled to about 35° C. The resulting filament of 16 denier had, at 65% relative humidity and 72° F., a tensile strength of one gram per denier and a breaking extensibility of 30%.

*Example 27*

A copolymer was prepared by emulsion polymerization from 50 parts of acrylonitrile, 45 parts of ethyl acrylate, and 5 parts of 5-hydroxypentyl vinyl ether with the aid of a non-ionic emulsifier. Then adiponitrile emulsified in water was added in an amount to provide 20% by weight thereof based on the weight of copolymer. The solids content of the resulting dispersion was adjusted to 40%. This aqueous dispersion was passed under pressure at a constant rate of feed of 1.6 grams per minute through a spinneret having 40 holes each of 0.0025 inch diameter into a coagulating bath at 75° C. of aqueous 20% caustic soda solution. The rate of passage through this bath was 3.36 meters per minute. The distance of immersion was 40 cm. The yarn was washed as it passed over a roller, passed through a spray of aqueous 5% acetic acid solution, and washed again with water. The yarn was passed through an oven at 200° C. and was heat-stretched about 850% at about 225° C. The yarn then had a denier of 180, a tensile strength of 1.3 grams per denier, and an extensibility at break of 30%.

It is to be understood that changes and variations may be made without departing from the spirit and scope of the invention as defined in the appended claims.

We claim:
1. A composition adapted to be formed into fibers, films, and the like comprising an aqueous copolymer dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of at least one solvent for the copolymer selected from the group consisting of adiponitrile, α-methylsuccinonitrile, nitromethane, phenylacetonitrile, butyronitrile, hexanenitrile, N-methylsuccinonitrile, acrylonitrile, methacrylonitrile, endomethylenetetrahydrobenzonitrile, succinonitrile, benzonitrile, isobutyronitrile, and furonitrile, the amount of water and solvent being such that the copolymer remains dispersed in the composition in the form of undissolved particles.

2. A composition as defined in claim 1 in which the copolymer contains 60% to 90% by weight of acrylonitrile.

3. A composition as defined in claim 1 in which the copolymer contains 60% to 90% by weight of acrylonitrile and 10% to 40% of at least one ester of acrylic acid.

4. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

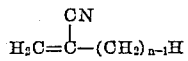

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of adiponitrile, the amount of water and adiponitrile being such that the copolymer remains dispersed in the composition in the form of undissolved particles.

5. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

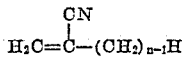

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of $\alpha$-methylsuccinonitrile, the amount of water and $\alpha$-methylsuccinonitrile being such that the copolymer remains dispersed in the composition in the form of undissolved particles.

6. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

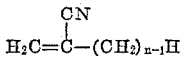

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of nitromethane, the amounts of water and nitromethane being such that the copolymer remains dispersed in the composition in the form of undissolved particles.

7. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

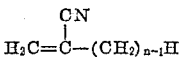

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of phenylacetonitrile, the amount of water and phenylacetonitrile being such that the co-polymer remains dispersed in the composition in the form of undissolved particles.

8. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

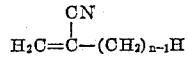

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of methacrylonitrile, the amount of water and methacrylonitrile being such that the copolymer remains dispersed in the composition in the form of undissolved particles.

9. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of at least 50% by weight, based on the total weight of the monomers, of at least one monomer of the formula

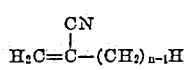

wherein $n$ is an integer having a value of 1 to 2 and at least one other copolymerizable monoethylenically unsaturated comonomer, up to ten percent by weight, based on the weight of the monomers, of an emulsifying agent therefor, and from 1% to 40% by weight, based on the weight of the copolymer, of succinonitrile, the amount of water and succinonitrile being such that the copolymer remains dispersed in the composition in the form of undissolved particles.

10. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of adiponitrile, the amount of water and adiponitrile being such that the copolymer remains dispersed in the composition in the form of undissolved particles.

11. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of $\alpha$-methylsuccinonitrile, the amount of water and $\alpha$-methylsuccinonitrile being such that the copolymer remains dispersed in the composition in the form of undissolved particles.

12. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of nitromethane, the amounts of water and nitromethane being such that the copolymer remains dispersed in the composition in the form of undissolved particles.

13. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of phenylacetonitrile, the amount of water and phenylacetonitrile being such that the copolymer remains dispersed in the composition in the form of undissolved particles.

14. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of methacrylonitrile, the amount of water and methacrylonitrile being such that the copolymer remains dispersed in the composition in the form of undissolved particles.

15. A composition adapted to be formed into fibers, films, and the like comprising an aqueous dispersion containing about 35 to 80% by weight of water, about 20% to 65% by weight respectively of dispersed particles of a water-insoluble emulsion copolymer of a mixture of 60% to 90% by weight of acrylonitrile with 10% to 40% by weight of at least one other copolymerizable monoethylenically unsaturated comonomer, up to ten percent by weight, based on the weight of the monomers, of an emulsifying agent therefor, and from 1% to 40% by weight, based on the weight of the copolymer, of succinonitrile, the amount of water and succinonitrile being such that the copolymer remains dispersed in the composition in the form of undissolved particles.

16. A composition adapted to be formed into fibers, films, and the like comprising an aqueous dispersion having a pH of at least about 7 and containing about 35 to 80% by weight of water and about 20 to 65% by weight respectively of dispersed particles of a water-insoluble emulsion copolymer of a mixture of at least 50% by weight, based on the total weight of the monomers, of at least one monomer of the formula

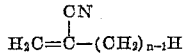

wherein $n$ is an integer having a value of 1 to 2 and at least one other copolymerizable monoethylenically unsaturated comonomer, up to ten percent by weight, based on the weight of the monomers, of an emulsifying agent therefor, and from 1 to 40% by weight, based on the weight of the copolymer, of at least one substance selected from the group consisting of adiponitrile, $\alpha$-methylsuccinonitrile, nitromethane, phenylacetonitrile, butyronitrile, hexanenitrile, N-methylsuccinonitrile, acrylonitrile, methacrylonitrile, endomethylenetetrahydrobenzonitrile, succinonitrile, benzonitrile, isobutyronitrile, and furonitrile, the amounts of water and solvent being such that the copolymer remains in the form of undissolved particles dispersed in the composition by the emulsifying agent.

References Cited in the file of this patent
UNITED STATES PATENTS

| | | |
|---|---|---|
| 2,404,715 | Rogers | July 23, 1946 |
| 2,658,879 | Beaman | Nov. 10, 1953 |
| 2,671,768 | Halbig | Mar. 9, 1954 |
| 2,687,938 | Chaney | Aug. 31, 1954 |
| 2,775,567 | Basdekis | Dec. 25, 1956 |
| 2,787,610 | Janssen | Apr. 2, 1957 |
| 2,868,752 | Frazier et al. | Jan. 13, 1959 |
| 2,869,975 | Hare | Jan. 20, 1959 |
| 2,879,242 | Weinstock | Mar. 24, 1959 |

FOREIGN PATENTS

| | | |
|---|---|---|
| 497,018 | Belgium | July 31, 1950 |

OTHER REFERENCES

Scheflan et al.: "Handbook of Solvents," D. Van Nostrand Company, Inc. (1953) page 92.